United States Patent [19]
Graham et al.

[11] Patent Number: 5,685,347
[45] Date of Patent: *Nov. 11, 1997

[54] CIRCULAR AIR BAG MADE OF TWO SIMULTANEOUSLY WOVEN FABRICS

[75] Inventors: Raymond Graham, Bradford; Christopher Paul Kavanagh, Congleton; Simon Valkenburg, MacClesfield; Michael Gervase Litton, Prestwick, all of Great Britain

[73] Assignee: Airbags International Limited, London, England

[*] Notice: The term of this patent shall not extend beyond the expiration date of Pat. No. 5,651,395.

[21] Appl. No.: 431,466

[22] Filed: May 1, 1995

Related U.S. Application Data

[63] Continuation of Ser. No. 743,282, filed as PCT/GB90/00215, Feb. 12, 1990, abandoned.

[30] Foreign Application Priority Data

| Feb. 16, 1989 | [GB] | United Kingdom | 8903559 |
| Sep. 27, 1989 | [GB] | United Kingdom | 8921838 |

[51] Int. Cl.⁶ .............................. D03D 1/04; B60R 21/16
[52] U.S. Cl. .......................... 139/390; 280/728.1
[58] Field of Search .................. 280/728, 739, 280/743, 733; 28/140, 143, 151; 139/1 R, 386, 384, 389, 390

[56] References Cited

U.S. PATENT DOCUMENTS

| 3,792,873 | 2/1974 | Buchner et al. | 139/389 |
| 3,991,249 | 11/1976 | Yamashita et al. | 139/389 |
| 4,003,588 | 1/1977 | Oka et al. | 139/389 |
| 4,025,684 | 5/1977 | Neidhardt et al. | 139/389 |
| 4,921,735 | 5/1990 | Bloch | 139/389 |
| 5,131,434 | 7/1992 | Krummheuer et al. | 139/383 R |
| 5,178,408 | 1/1993 | Barrenscheen et al. | 139/383 R |

FOREIGN PATENT DOCUMENTS

| 2020847 | 11/1992 | European Pat. Off. | 139/389 |
| 4126709 | 3/1992 | Germany | 139/389 |
| 5051837 | 3/1993 | Japan | 139/389 |
| 6412478 | 5/1965 | Netherlands | 139/389 |
| 1318687 | 5/1973 | United Kingdom | 139/389 |
| 1507152 | 4/1978 | United Kingdom | 139/389 |

Primary Examiner—C. D. Crowder
Assistant Examiner—Larry D. Worrell, Jr.
Attorney, Agent, or Firm—Kohn & Associates

[57] ABSTRACT

A method of forming an air bag which includes the steps of weaving on a loom an upper and lower fabric simultaneously, the two fabrics being combined in selected areas to define a seam of substantially circular shape. A bag is produced by cutting within the seam. The bag does not have an additional coating, but the permeability of the bag is determined by controlling the sett thereby utilizing the permeability of the weave itself.

6 Claims, 8 Drawing Sheets

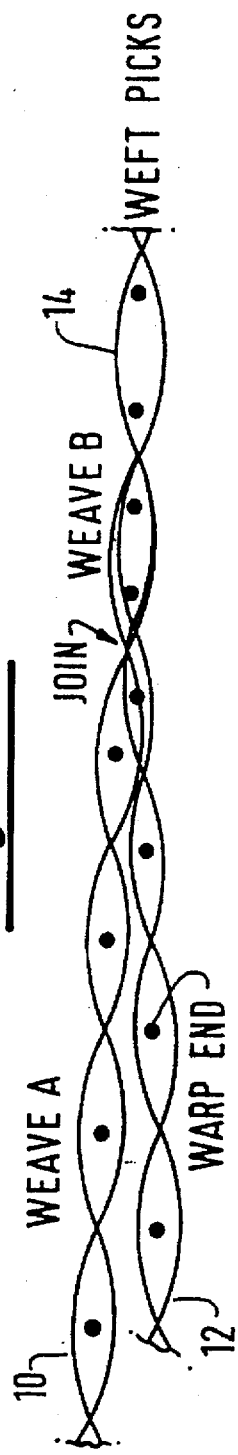
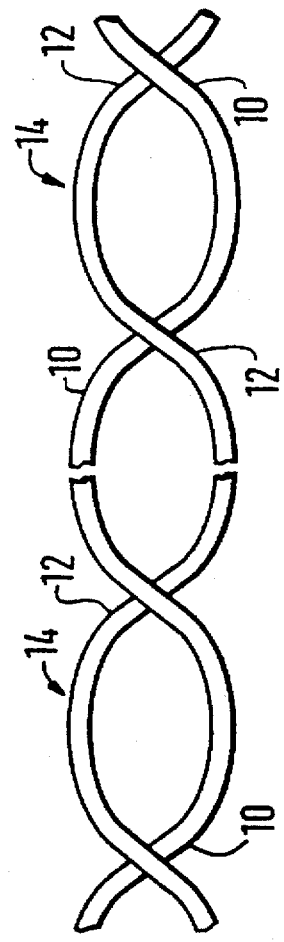
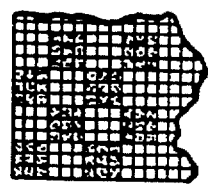
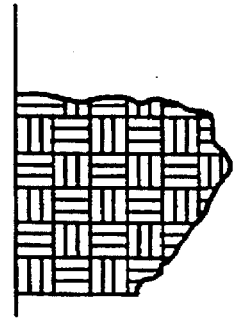
Fig-4A
Fig-4B
Fig-9A
Fig-9B
Fig-9C

CIRCULAR AIR BAG MADE OF TWO SIMULTANEOUSLY WOVEN FABRICS

This is a continuation of application Ser. No. 07/743,282 filed as PCT/GB90/00215 Feb. 12, 1990, now abandoned.

This invention relates to an air bag and in particular relates to an inflatable air bag for the protection of vehicle occupants in the event of a collision.

Considerable interest is at present being shown in the wider application of air bag safety restraints for use in transportation. These are in general bags stowed towards the front of the passenger compartment of a vehicle arranged to inflate rapidly in the event of a collision and thus restrain the occupants of the vehicle and prevent them being injured by being thrown against hard internal surfaces within the vehicle. Currently produced air bags, especially those for the driver's side, tend to be manufactured from a chlorobutadiene rubber coated polyamide (nylon) fabric. The chlorobutadiene rubber (Neoprene) makes the fabric impermeable to gases and particles, provides flame resistant properties to the basic strength bearing fabric, has relatively good long term aging performance and facilitates the production and assembly of the bag which can be carried out by vulcanizing or by sewing. In the latter case the dimensional stability and ease of cutting conferred on the basic polyamide fabric by the synthetic rubber is advantageous. A polyamide textile material is chosen because of its good strength and in particular its good elongation characteristics and because of its free availability. This combination has proved successful in air bag applications to date especially where pyrotechnic means of generating the gases for inflation are employed. However the fabric is relatively expensive to produce and is relatively bulky.

The use of a coating has led to the adoption of venting holes to provide an energy absorption function. Thereby development engineers have had relatively few, simple, parameters to 'tune', for example vent hole size and number, bag diameter and the provision and placing of restraining straps if used.

There have been proposals to weave air bags in one piece using a double weave method to produce a "pillow case"-like product. However such square bags have not found favor for driver-side applications for a variety of reasons: for example, they are bulkier than an equivalent-circular bag, therefore more difficult to conceal, and their inflation characteristics are not the same as circular bags, leading to the need for larger capacity gas generators.

The invention seeks to provide a method of producing air bags which will be more efficient to produce with a higher and more consistent quality than is currently available. Furthermore the invention seeks to provide an air bag which is less bulky and takes up less space in its stored condition.

SUMMARY OF THE INVENTION

In its broadest aspect the present invention provides a method of manufacturing an air bag by weaving on a loom which comprises forming an upper and lower fabric simultaneously and causing the two fabrics to be combined in selected areas of a desired shape whereby to define and enclose or substantially enclose space.

By the method of the invention the main body of an air bag can be woven in one operation without requiring fabric to be cut and sewn (or adhered), and the shape woven may be chosen to give any two dimensional shape of final bag, e.g. circular or at least non-square. It will be appreciated that it is relatively easy to weave a square double fabric, but the production of other shapes such as a circle has not hitherto been considered practical.

Furthermore, the air bag in accordance with the invention may, but will preferably not, be provided with a coating, as it is both expensive and vulnerable to ageing degradation and damage. The permeability of the bag may be controlled either by having an extremely tight weave which may then require vent holes as with the current air bag proposals, or by utilizing the weave permeability itself and having no separate purpose-cut vent holes. The bag of the invention will preferably be provided with a throat to enable it to be attached to currently-available gas generators for inflation.

In systems where the heat produced by the initial explosion of the gas generator would damage the fabric, additional protection may be incorporated, at least in the throat area. However, as generator technology improves it is expected that the need for this will decrease.

In accordance with the invention the air bag is woven substantially in one construction with reinforced edges. The weave allows for any shape which can be reduced to two or more flat plies, on top of each other. However it is preferred to produce a substantially circular bag such as would be required for a driver's side device in a vehicle.

The manufacturing method of the invention allows a further advantage. In some current designs of bag internal straps are positioned within the bag so as to limit and control the degree of inflation of the bag. The addition of these straps further increases the cost of producing a conventional bag. In accordance with the invention, such limiting straps can be woven in at the same time that the bag is produced without significantly increasing production times.

The air bags of the invention are preferably woven from synthetic yarns such as polyamide or polyester, especially the former but other yarns such as polyolefin, including polyethylene and polypropylene, acrylic, aramid, carbon, glass ceramic may be used as may natural fiber yarns. The yarns may be in the form of mono- or multi- filaments or staple fibers. Yarn counts may vary widely, e.g. between 100 and 2000 Dtex, and specific counts found useful include 235, 350, 470, 940, and 1880 Dtex. A combination of counts in the same fabric may be used.

Looms on which the bag of the invention may be produced include those having a jacquard or equivalent mechanism, e.g. specifically having an open shed, closed shed, center shed, double lift, mechanical or electronic jacquard, especially the latter. Examples include water jet, air jet, shuttle, projectile, needle or rapier (rigid or flexible) looms, and rapier or projectile looms are currently preferred.

The weave pattern is chosen in accordance with the desired characteristics of the bag to be produced especially with regard to such characteristics as permeability of the final weave. Normally the weave should be fairly tight to control the permeability of the bag, especially the upper or "face" side. In order to achieve a maximum setting the following formula may be employed:

$$T = D \times W/(W+I)$$

wherein: T=No. of threads/cm
D=No. of thread diameters/cm
W=No. of threads/repeat of weave
I=No. of intersections/repeat of weave
For example, using a 940 Dtex yarn:

$$T = 30.81 \times 2/(2+2)$$

$$= 15.4/cm$$

Where: D is 30.81 for a 940 Dtex yarn
W is 2 threads per repeat
I is 2 intersections per repeat By using this construction in combination with different weave patterns, different front and back fabrics can be produced and permeability tailored to end-use requirements. Furthermore, by controlling the woven fabric density the stability and security of the woven seam is ensured without the necessity of additional aids to prevent slippage, e.g. adhesive, polymer or resin impregnation or coating.

In many instances it is preferable to weave the bag with unstabilised yarn after which it can be heat set to induce shrinkage and produce the final stabilised end product.

The invention will be described further, by way of example, with reference to the accompanying drawings, in which:

BRIEF DESCRIPTION OF THE DRAWINGS

FIG. 4(a) and 4(b) are an enlarged diagrammatic sectional view through the bag at a join taken on lines 4—4 in FIG. 1 shown of the interlacing;

FIGS. 9(a), 9(b) and 9(c) illustrate an alternative weave of the edge of the joint;

DETAILED DESCRIPTION

Figure 1:
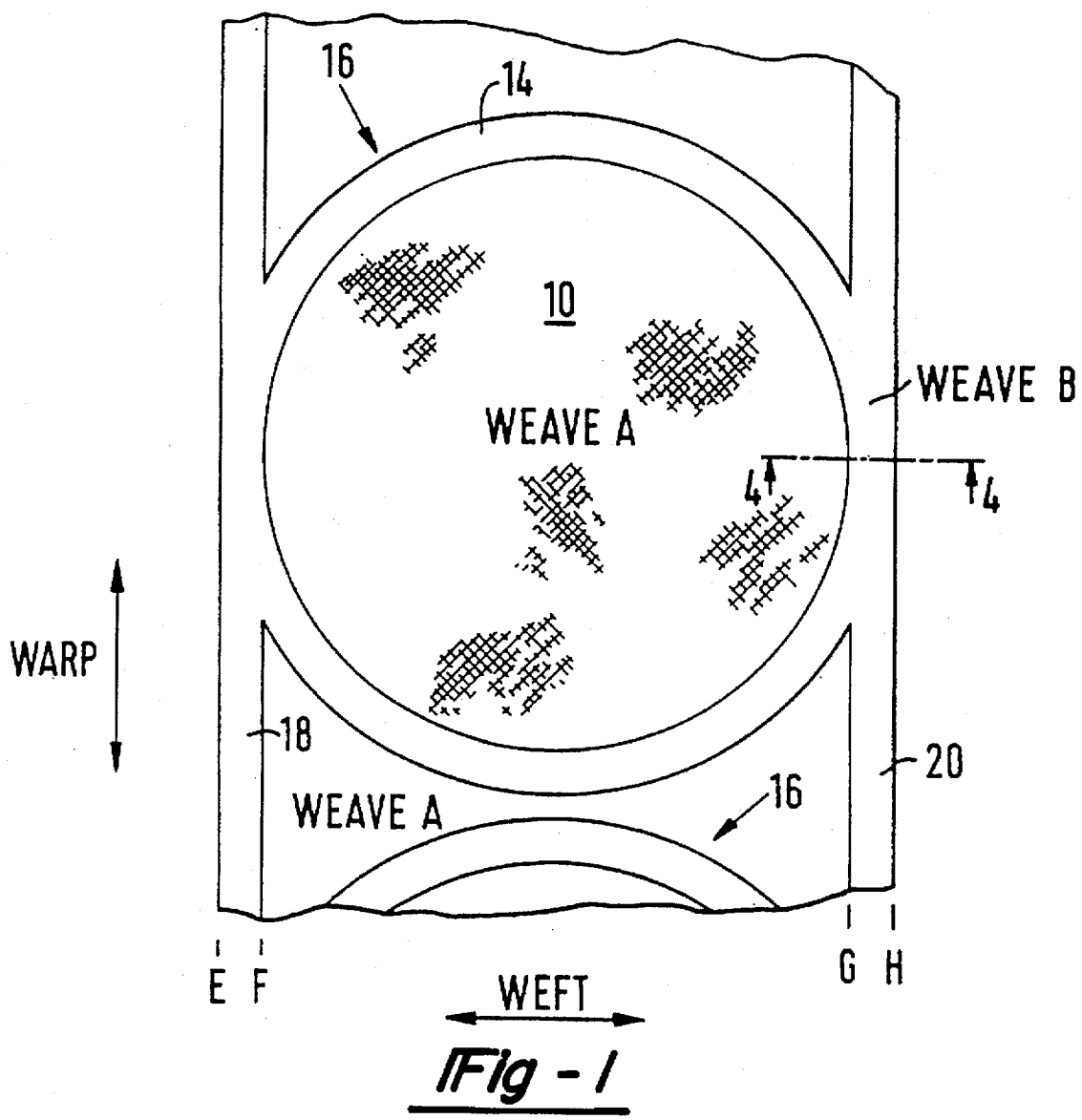
FIG. 1 is a partial plan view of a circular air bag being produced on a loom.
Figure 2:
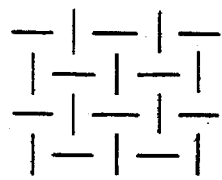
FIG. 2 illustrates the weave of the fabric layers in the bag of FIG. 1.
Figure 3:
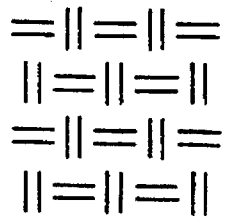
FIG. 3 illustrates the weave of the bag edges in the bag of FIG. 1.

Referring to the drawings, FIG. 1 illustrates fabric production on a loom wherein two fabrics or plies are produced simultaneously being joined at selected areas as described more fully hereinafter. As can be seen more clearly from FIG. 4, an upper fabric 10 and lower fabric 12 are produced simultaneously using a weave referred to as 'weave A'. This constitutes two quite separate plies. However at selected area or join portions 14, the two fabrics 10 and 12 are combined into a single fabric referred to as 'weave B'. In one example the portions 10 and 12 may be woven in a plain weave (FIG. 2) and when brought together at 14 a hopsack weave (FIG. 3) combines the two. Other combinations of weave are possible.

As an alternative, illustrated in FIG. 4(b), a "cross-over" joint may be used. In this the top 10 and bottom 12 fabrics are interchanged several times to form the seam, e.g. with a spacing of 5 mm. Again the seam will be substantially circular in plan view. This construction has the advantages of good energy-absorption capabilities, even yarn take-up during weaving, and higher resolution of the circular shape. Furthermore, the load path in a yarn during dynamic inflation of the bag is more favorable.

In this manner, in one continuous operation a number of air bags generally designated 16 can be produced. Cutting round the join area 14 releases each air bag 16 from the fabric web. The shape of the air bag, in the present case circular, and its size, can be adjusted by using the loom programming means, for example the Jacquard mechanism, to produce the desired weaves and portions 10, 12 and 14 respectively. The weave sett is preferably square after finishing, that is the number ends/cm equals the number of picks/cm and the bag preferably has symmetry from left to right and from top to bottom.

In order to simplify the weaving process it is preferable that the bands 18, 20 running in the warp direction along the selvedge of the fabric (E-F and G-E in FIG. 1) are woven from warp ends run from separate warp beams whereas the main width of the fabric (between F and G in FIG. 1) are from the main loom warp beam.

Figure 5:
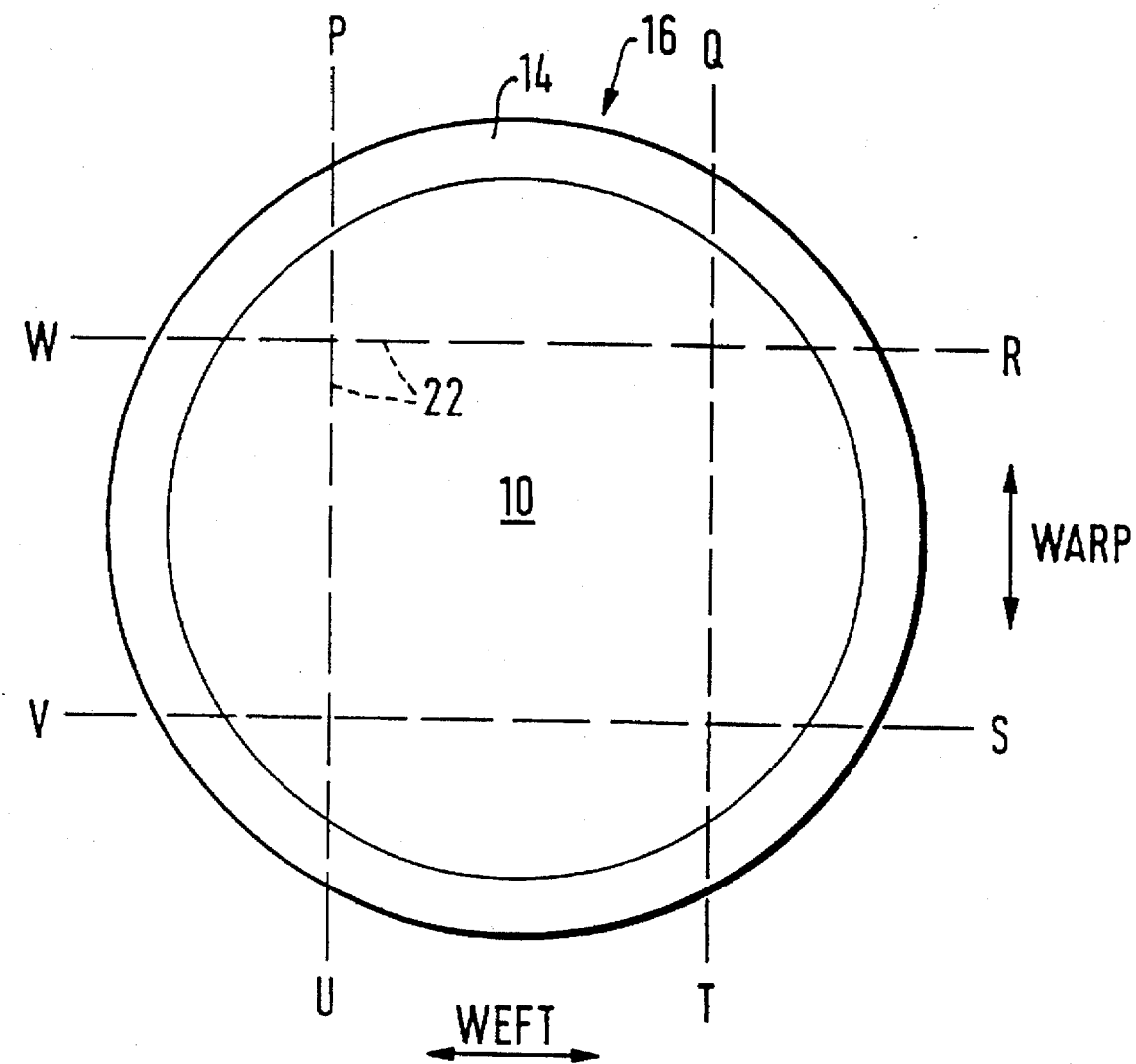
FIG. 5 is a diagrammatic plan view of a bag illustrating the positioning of straps.
Figure 6:
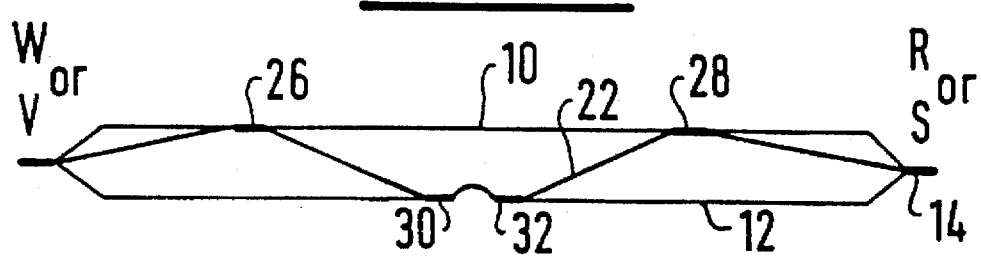
FIG. 6 is a section on lines W-R or V-S in FIG. 5.
Figure 7:
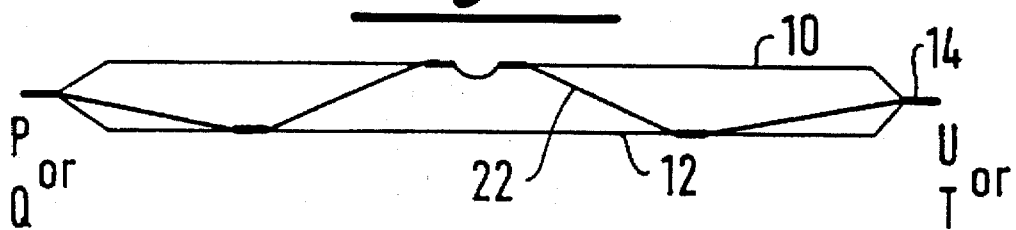
FIG. 7 is a section on lines P-U or Q-T in FIG. 5.

In order to control the inflation of the bag when finished, 'straps' 22 (FIGS. 6 & 7) may be formed during weaving. The 'straps', with the method of the invention, can best be incorporated as loose yarns in either warp or weft direction, warpwise straps being indicated in FIG. 5 by the letters P-U and Q-T, and weftwise straps are indicated by the letters W-R and V-S. Preferably the fibers forming the straps are of stronger, non-shrink heat resistant textile material such as aramids, e.g. Kevlar. Referring to FIG. 6, in which the straps 22 are woven in the weft direction, aramid fiber wefts are introduced along with the main body wefts at a W-R and/or V-S. The Aramid fibers 22 are attached to the upper fabric 10 at 26 where they are woven together with the body wefts, and again at 28. The aramid wefts are also attached at 30 and 32 to the lower fabric 12 in a similar manner. Similar woven attachment points are provided for aramid warps P-U or Q-T as shown in FIG. 7.

Figure 8:
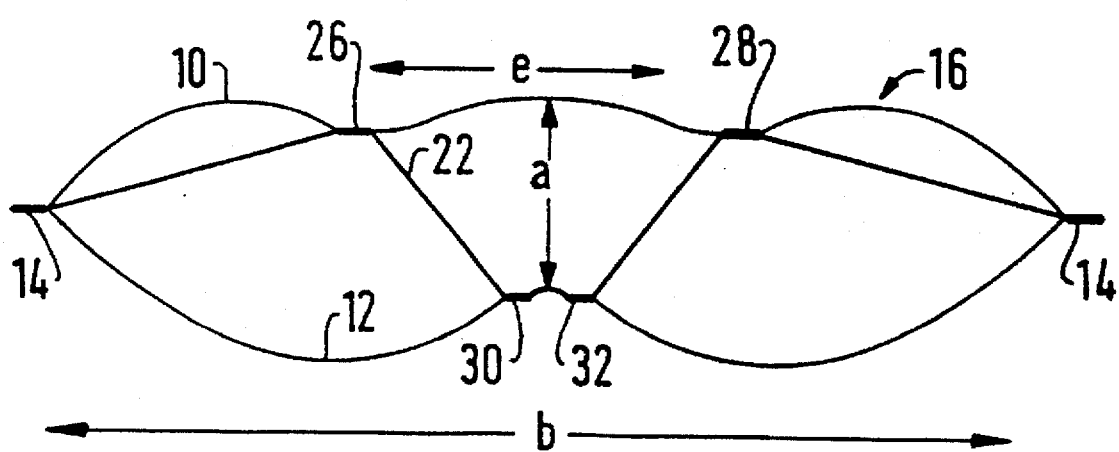
FIG. 8 is a sectional view of a bag when inflated.

FIG. 8 illustrates the bag of FIG. 6 when inflated. The polyamide yarns of the bag body are preferably unstabilised and therefore shrink in a controlled manner up to 20% during finishing of the fabric. The aramid straps 22 do not shrink and thus remain slack within the finished bag body 16. The shape of the inflated bag can be adjusted by changing the points of contact between the aramid straps 22 and the upper and lower fabrics 10, 12 by changing the programmed pattern. In FIG. 8 the bag inflated depth is indicated by 'a' and its width by 'b'. The reference 'c' indicates the distance between the upper attachment points 26 and 28. To increase the ratio a/b the distance c is increased whereas to decrease the ratio a/b the distance c is decreased. The straps 22 may be provided singly, in pairs, or in sets of more than two. Weftwise only, warpwise only, or both warp and weftwise straps my be provided. The latter gives more control of the inflated shape of the bag 16.

Figure 14A:
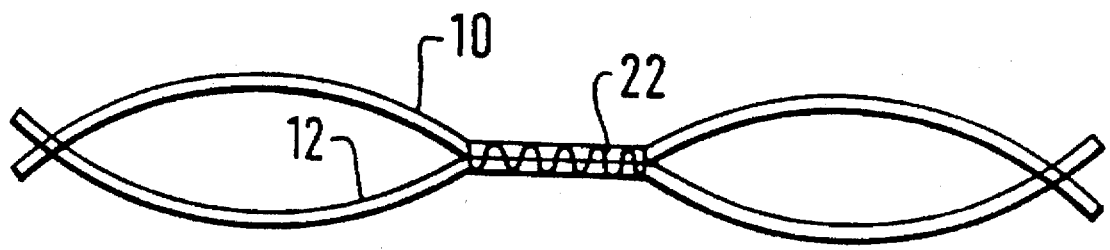
FIGS. 14(a), 14(b) and 15 are a similar views to FIGS. 5 & 6 of a modified form of strap.
Figure 14B:
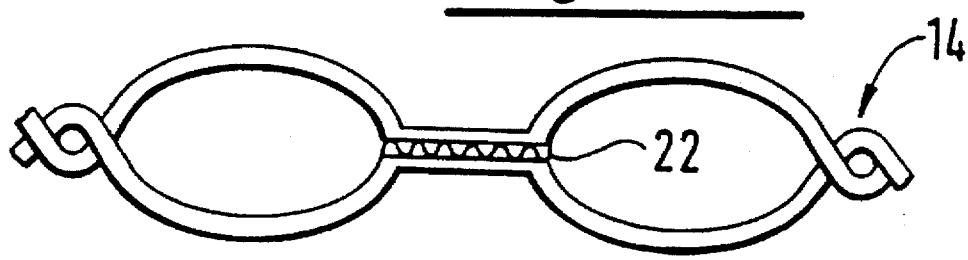
Figure 15:
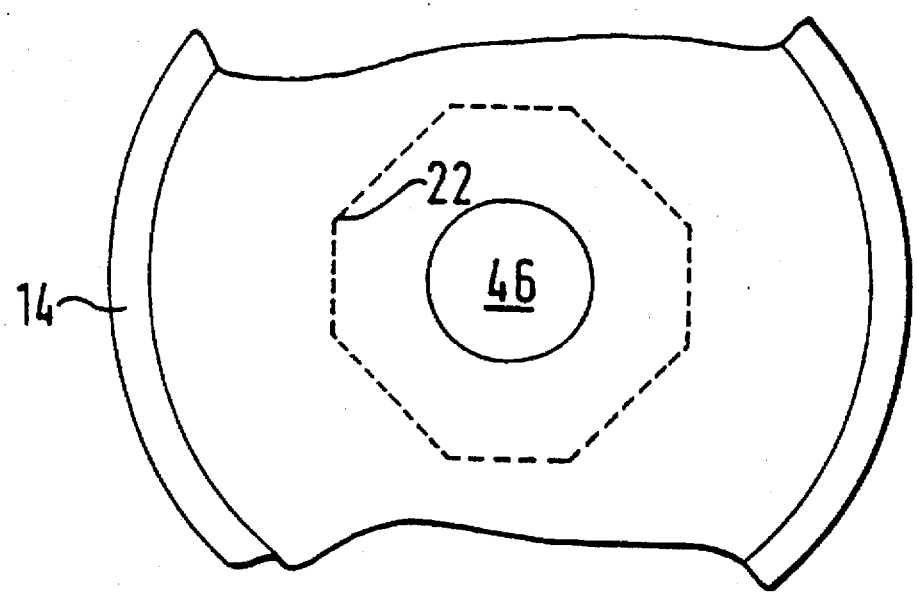

In another embodiment of the invention the "straps" may be formed of low tenacity yarn and be very short, as at 22' in FIGS. 14 and 15. Thus the upper and lower fabrics are effectively joined together by the straps 22' which will break during inflation of the bag. This provides a "tearing" effect which will control bag shape during inflation thus absorbing energy and reducing the risk of "bag slap" without the need of conventional straps or tethers.

Figure 16A:
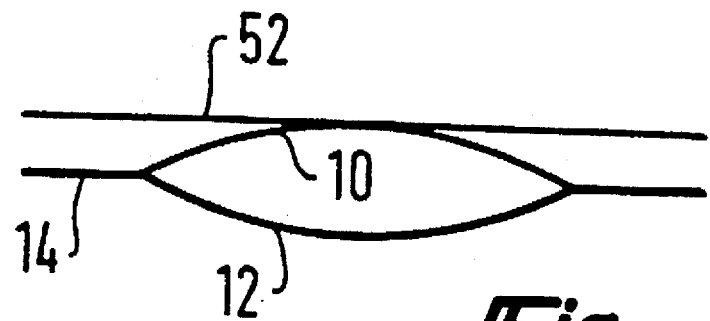
FIGS. 16(a) and 16(b) illustrate another form of strap construction.

An alternative way of forming a more conventional strap 22 is illustrated in FIG. 16. This is by weaving a third (and possibly a fourth) layer 52 of fabric during the weaving process, attached to the main bag body in the center. The area of attachment may be circular, square, or any other desired shape to suit end-use. Moreover, the weave pattern may be plain for the main area of the fabric layer 52 and hopsack where it is attached to the upper fabric 10. This would compensate for the high yarn density.

Figure 16B:
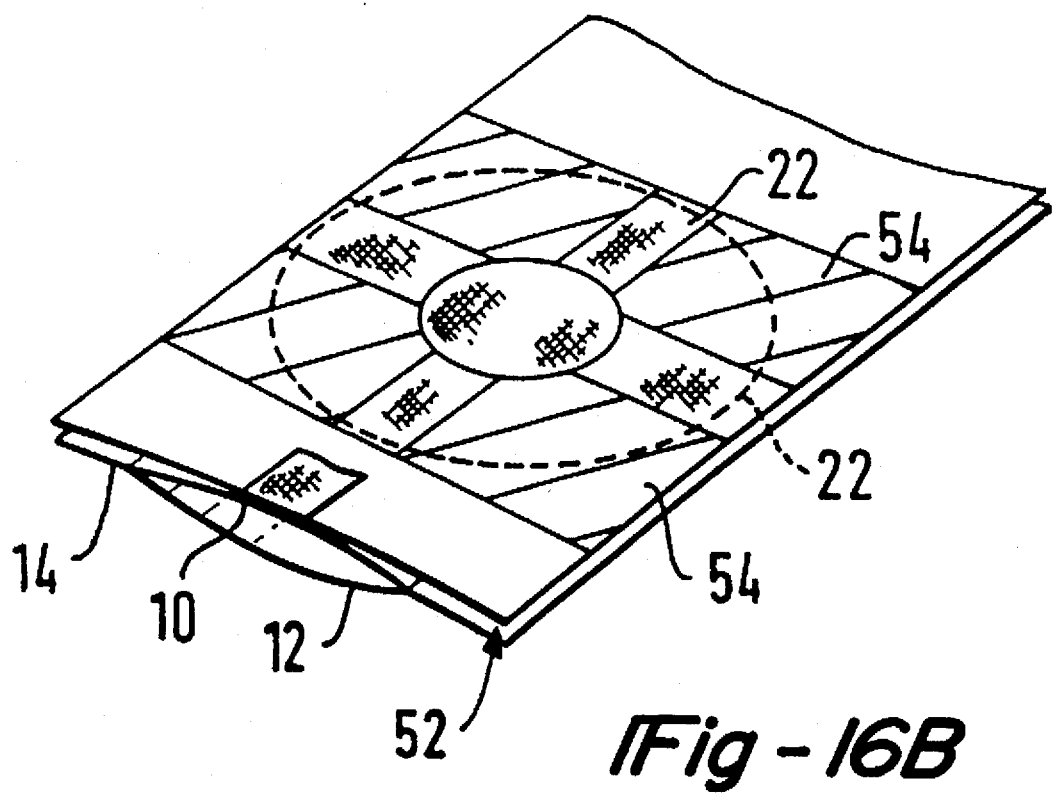

Once woven and finished, the extra layer 52 is cut so as to remove the shaded area 54 (in FIG. 16(b)), leaving "straps" 22, the free ends of which can be sewn into the throat area of the bag in a conventional manner, after turning the bag inside-out and cutting the throat hole.

The extra layer 52 can be coated in a conventional process, e.g. with a chlorobutdiene rubber such as Neoprene, to provide a degree of binding of the warp and weft yarns before cutting.

If a fourth layer of fabric (not shown) is woven, attached to the lower fabric 12, and processed as described above, the free ends of the upper and lower straps 22 may be joined to one another once the bag is turned inside out, to give a similar construction to FIG. 8.

In a particular example 470 decitex high-shrink nylon yarn was chosen to enable a tight weave to be produced.

However heavier yarns may be preferable in certain circumstances where the bag may be coated and in this case the weave density will be more open. For even lighter bags a yarn of 235 decitex or 350 decitex may be used. The yarn is unstabilised to allow shrinkage after weaving thus giving a tighter weave after the fabric has been finished. The throat construction can be made by conventional sewing methods after hot cutting a hole in the center of one face of the bag. The throat connects to a conventional gas generator to produce the inflation of the bag in use.

In certain cases it is preferable to change the weave pattern in the area of the seam or join portion 14 to a 3/3 hopsack in order to give the same amount of take up in this area as there is in the plain weave top and bottom portions of the bag. This form of weave is illustrated in FIG. 9. The preferred width of seam is about 20 mm.

With this method of air bag construction it is possible to incorporate combined venting and filtering at the weaving stage.

Figure 10:
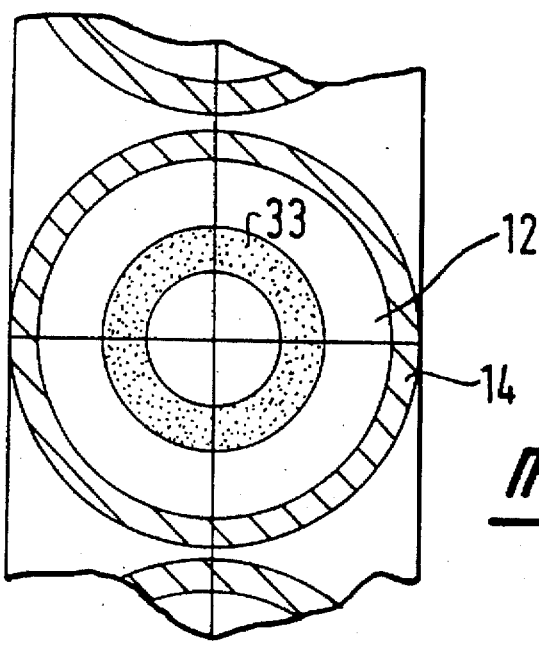
FIG. 10 illustrates a form of fabric having a reinforced area.

In one method, illustrated in FIG. 10, a vent/filter 33 is formed on the back face or lower fabric 12 by weaving a circle of open construction. This annular ring 33 may be anywhere between the outer join, or seam portion, 14 and the central area at which it is intended to mount the gas generator. The main fabric may be plain weave as before and the seam 14 hopsack. The vent/filter may be 3/3 weave compared to a 1/1 weave on the other face. If an alternative shape of area 33 is desired this can be programmed.

It is preferable here to use symmetrical weave patterns to reduce stress concentrations and differences in tension during the shock loading of deployment.

Figure 12:
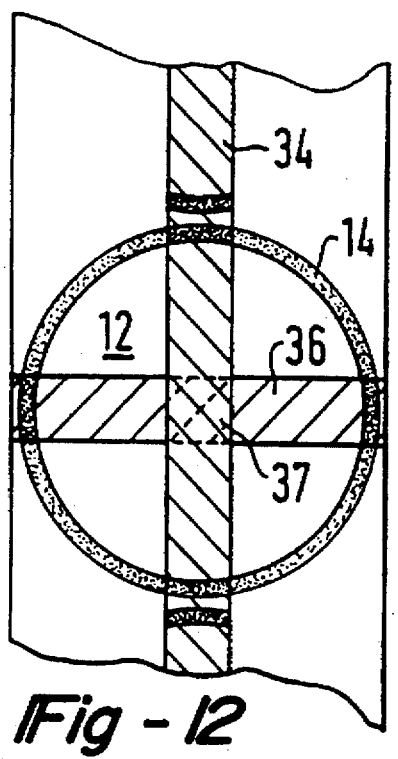
FIG. 12 illustrates a reinforced throat area.

In another embodiment, as illustrated in FIG. 12, a reinforced area for attaching the gas generator is provided by weaving two reinforced bands 34 & 36, in warp and weft respectively to form a cross. Extra yarns are provided in these areas over and above the normal yarns from another beam. In the center of the so-formed cross there is thus made an area 37, with double yarn density thereby providing a reinforced area for the generator.

This reinforced area 37 can be used for simply cutting a hole or holes, to match the pattern required for the generator mounting, without any further reinforcements being necessary. The fabrics 10 & 12 may be plain weave and the seam 14 a 3/3 hopsack as before, thus the area 37 will be a double-density plain weave.

Where the reinforced center section is utilized, it is often preferable to construct the required throat reinforcement by welding or moulding a rigid or semi-rigid ring of compatible material, in the case illustrated of Nylon 6/6, directly to the material of the bag mounting face.

Figure 13A:
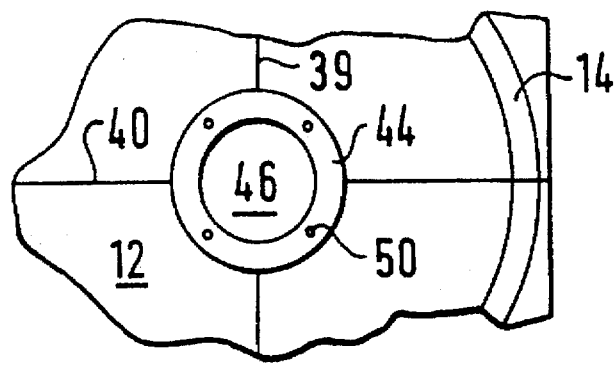
FIGS. 13(a), 13(b) and 13(c) illustrate the use of a welded throat ring.
Figure 13B:
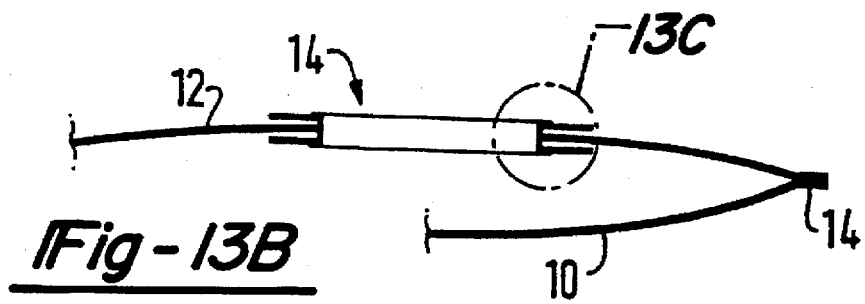
Figure 13C:
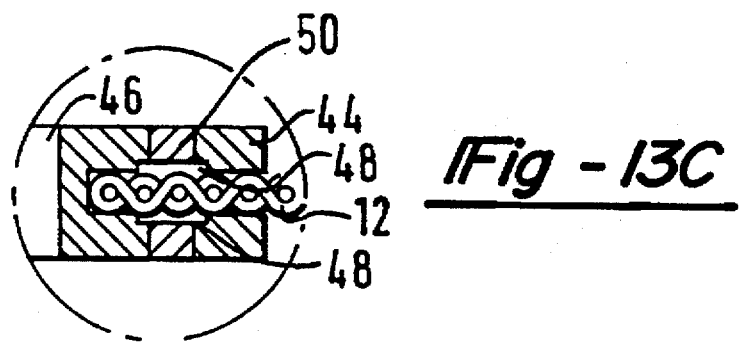

Such a construction is illustrated in FIG. 13. A ring 44 is assembled from two components placed either side of the fabric 12. On the internal face of each ring component is an annular groove 48 in which a weld "gasket" of consumable material 49 sits. On completion of the weld process this material fuses to the fabric and ring component, giving a homogeneous joint. The ring provides a central aperture 46 giving the gas generator access to the interior of the bag and is provided with holes completely through the construction 50 in certain points by which means the generator is attached.

Figure 11A:
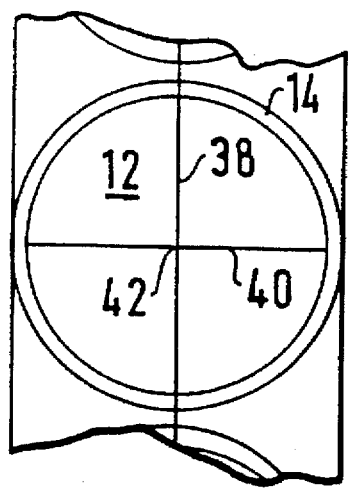
FIGS. 11(a) and 11(b) illustrate the use of colored yarn for centering.
Figure 11B:
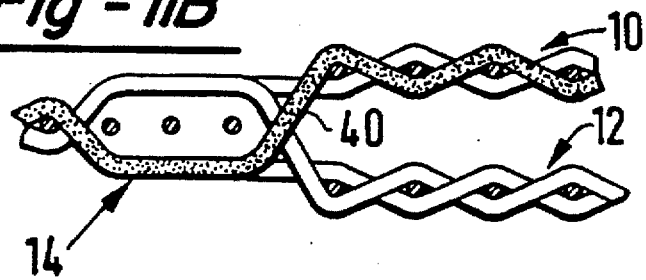

A moulded ring may be manufactured to a very similar design but is made using injection moulding techniques with the fabric positioned inside a pressurized tool.

Where throat constructions as above are made, accurate location of the center point is achieved by coloured yarns 38, 40 which are woven in warp and weft as illustrated in FIG. 11. The principle of selecting a coloured yarn, e.g. in the weft direction, can also be used to create a code, such as a bar code, which can be used, for example, to uniquely identify the bag or batch by encoding a serial number or the like.

Use of a lower count of yarn, for example 235 decitex or 350 decitex, may in certain instances be advantageous. Advantages would include lower weight and lower packing volumes. However this may necessitate an alteration int the weaving of the join or seam 14 owing to limitations of the Jacquard machine used. Specifically, it may be necessary to jump two yarns at a time because there are not sufficient hooks available to make the finer fabric in this area.

The bag of the invention provides a simple and less expensive alternative to current designs of vehicle inflatable air bags. The invention may especially advantageously used in recently discussed European systems and in side impact systems where space and cost are at a premium.

We claim:

1. A method of manufacturing an air bag free from a non-permeable coating by weaving on a loom which comprises:

forming at least an upper and lower permeable fabric simultaneously;

simultaneously weaving said upper and lower fabrics together in selected continuous peripheral area such that a continuous substantially circular seam of a combined fabric is formed thereat that encloses a space with a substantially circular periphery;

cutting the fabric about the entire continuous seam to produce said air bag; and controlling sett of the weave thereby controlling permeability of the weave itself free from additional coatings added to said air bag.

2. A method as claimed in claim 1 in which the weave is tight in at least the upper or "face" side and is chosen in accordance with the following formula $$T = D \times W/(W+m)$$

wherein: T=No. of threads/cm

D=No. of thread diameters/cm

W=No. of threads/repeat of weave

I=No. of intersections/repeat of weave.

3. A method of manufacturing an air bag by weaving on a loom which comprises forming at least an upper and lower fabric simultaneously and simultaneously weaving the two fabrics together in a selected area of a substantially circular shape to define and enclose a space with a circular periphery, and weaving at least one of the fabrics in an area with a more open and permeable construction relative to the remainder of the bag whereby to act as a vent/filter.

4. A method as claimed in claim 1 in which the fabrics are woven from one of synthetic yarns selected from the group consisting of polyamide, polyester, polyolefin, acrylic, aramid, carbon, gals ceramic and natural fiber yarns.

5. A method as claimed in claim 4 in which the yarns are in the form selected from the group consisting of mono- and multi-filaments and staple fibers.

6. A method as claimed in claim 5 in which the yarn counts are in the range 100 to 2000 Dtex.

* * * * *